April 16, 1946.　　　O. J. BRATZ　　　2,398,692
RIP CORD FITTING
Filed April 9, 1942
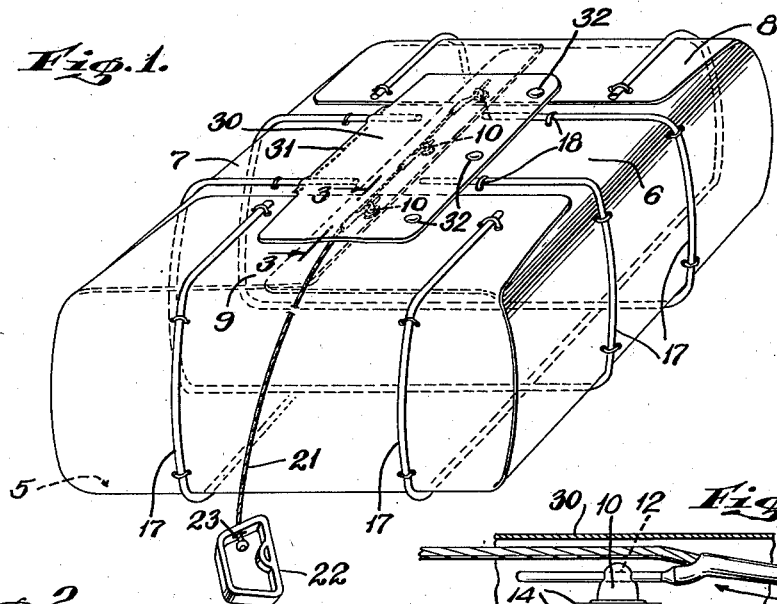
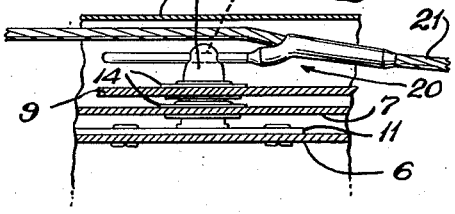
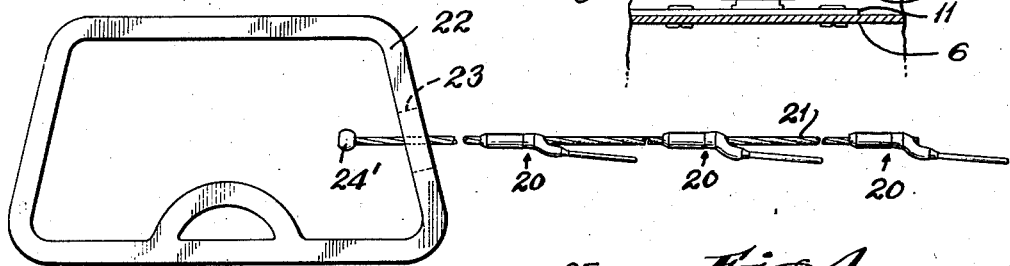
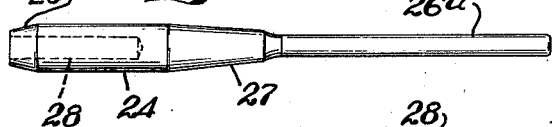
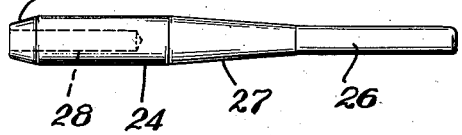
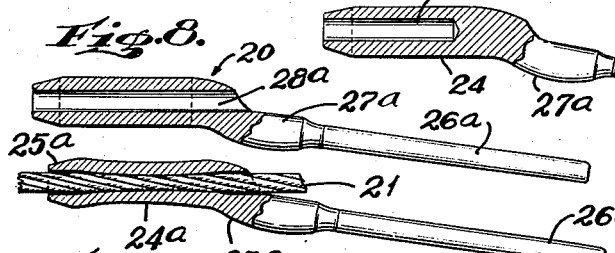
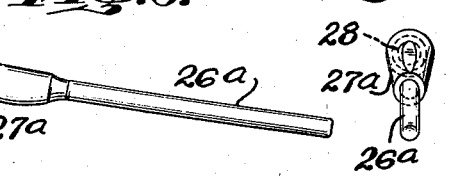
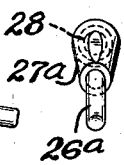
INVENTOR
OTTO J. BRATZ
BY
ATTORNEY Patented Apr. 16, 1946

2,398,692

UNITED STATES PATENT OFFICE 2,398,692

RIP CORD FITTING

Otto J. Bratz, Adrian, Mich., assignor to American Chain & Cable Company, Inc., Bridgeport, Conn., a corporation of New York Application April 9, 1942, Serial No. 438,345

2 Claims. (Cl. 244—149)

This invention relates to a rip cord assembly and a method of making rip cord pins and attaching the same to a rip cord.

This invention relates more particularly to a rip cord assembly for releasing a parachute pack container folded about a parachute pack and an assembly which consists of a cord or wire strand or cable equipped with releasing pins.

Heretofore the releasing pin was tied to the rip cord or cable by wrapping wire held closed by tinning and the parts were tinned to secure the wrapping wire and releasing pin to the cable. It required a considerable amount of labor and also of skill to properly locate the free end of the pin in the plane of the axis of the cable and to make sure that the pin was securely fastened to the cable and that a plurality of pins when used were properly spaced and arranged in parallelism. Furthermore the wrapping wire presented an uneven surface to the surface of the canvas container and embedded itself in the canvas necessitating the application of more force to withdraw the releasing pin not only because of the embedding but also because the pin would of necessity be caused to vibrate in the aperture of the cone and bind on the wall of the aperture during the withdrawal.

One of the objects of this invention relates to a method of producing rip cord releasing pins and attaching such pins to a rip cord.

Another object of this invention consists in the provision of an improved rip cord releasing pin and assembly in which the releasing pin is securely fastened to the rip cord or cable and in which the axes of the thin or cone engaging or cone traversing portions of a plurality of releasing pins may lie in a common plane through the axis of the rip cord and at a predetermined angle with respect to the axis of the rip cord, and in which the pin attaching means presents a smooth surface to the canvas flaps of the container and a surface of minimum diameter, and therefore freely slidable over the canvas as the rip cord is pulled to release the container.

Other objects of the invention will appear from the following description taken in connection with the drawing, in which—

Fig. 1 is a perspective view of a parachute pack container provided with a rip cord assembly constructed in accordance with my invention;

Fig. 2 is a view showing the rip cord assembly;

Fig. 3 is a section on the line 3—3 of Fig. 1;

Fig. 4 shows a pin blank from which the releasing pin of my invention is fashioned;

Fig. 5 shows the pin blank after its reduced or cone engaging or cone traversing portion has been reduced and finished to final size;

Fig. 6 shows the reduced or cone engaging or cone traversing portion of the pin blank displaced laterally and angularly with respect to the axis of the body portion of the pin;

Fig. 7 is an end view of the releasing pin, as viewed looking toward the left in Fig. 6;

Fig. 8 is a longitudinal diametral section through the body of the finished releasing pin; and Fig. 9 is a section similar to that of Fig. 8 showing the body of the pin swaged on the cord.

For the purpose of disclosing my invention I have shown a parachute pack container which may be regarded as of conventional form and which may consist of canvas material having a central square portion or base 5 and flaps which by reference to the drawing may be referred to as a lower side flap 6, an upper side flap 7, a right-end flap 8 and a left-end flap 9, folded as indicated.

Secured to the upper side of the lower side flap 6 are a plurality of cones 10 shown here three in number arranged in a row and projecting upwardly from a base 11 suitably secured to the lower flap 6 parallel with the edge of the flap. The upper ends of the cones are provided with apertures 12 which may be aligned with each other and extend in the direction of the length of the base. These apertures may be of slightly larger diameter than that of the reduced portions of the releasing pins and may if desired be arranged in parallelism and at a slight angle with respect to the longitudinal center line of the base 11 to conform to the angular arrangement of said reduced portions with respect to the axis of the cord.

The upper side flap 7 is provided with three holes reinforced by grommets 14 to pass freely over all three of the cones 10. The end flaps 8 and 9 are each provided with one hole reinforced by a grommet to pass over an end cone 10, see Fig. 3.

Secured to the base of the pack container are spring rods 17 the ends of which are secured to the respective flaps as indicated at 18 urging the ends of the flaps away from the pack to lift the grommets from the cones and to open the container.

As is disclosed in Figs. 1 and 3 the flaps 7, 8 and 9 are retained in position over the lower flap 6 by means of releasing pins 20 carried by a cord 21 which may consist of a wire strand and may be equipped at one end with a cord operating means such as 22 which may be operated by the hand of the person using the parachute or which may be connected to the airplane or the like to open the container as the person using the parachute jumps into space. In Fig. 3 the cable is shown in a raised and rotated position for purposes of illustration. The cord 21 may pass through an opening 23 in the operating means 22 and be retained therein by a ball end fitting 24'.

Each of the pins 20 is preferably formed from a special pin blank such as shown in Fig. 4 which may be produced by swaging and/or machining and drilling. This pin blank is provided with a body portion 24 provided with a conical end 25, a reduced portion 26, and a tapered section 27, between said portions. The body portion may be drilled initially axially as shown at 28 to the depth indicated.

The reduced portion 26 may be further reduced to final diameter and finished in a rotary swaging machine, to the dimensions shown at 26a, Fig. 5. The next step in the operation of forming the releasing pin consists in bending the tapered section 27 to displace the reduced portion 26a of the pin axially and angularly with respect to the body 24 of the pin as disclosed at 27a in Figs. 6 and 7. The hole 28 in the body portion of the pin is then extended through the tapered section 27a as indicated at 28a, Fig. 8.

The releasing pin so formed is strung on the cord which is preferably a wire cable in the exact position desired and its body portion is swaged as by means of a rotary swaging machine and impacted on the cable reducing the body portion in diameter as shown at 24a, Fig. 9. In this operation the ends of the body portion are left unswaged as indicated at 25a and 27a, Fig. 9, to prevent cutting of the cable during the swaging operation and to permit the sections of the cable in the ends of the body portion to bend freely so as to prevent the cable from being cut or bent sharply over the edges of the ends of the body portion of the pin during handling, storage and shipment and during service.

It is the usual practice as shown in Fig. 1 to provide an auxiliary flap or cover 30 to cover and protect the cones and cable and pins to keep these parts serviceable. The flap may be stitched to the upper side flap 7 as indicated at 31 and its free edge may be connected to the flaps 6, 8 and 9 by readily releasable snap buttons 32 for the purpose of inspection and also to permit the container to open after the releasing pins have been withdrawn from the cones.

While I have shown and described what may be regarded as a conventional form of container, it is obvious of course that the invention is applicable to containers in which the flaps are overlapped in different relations and that the number of pins and cones employed may be varied. It is also to be understood that changes and modifications may be made within the principles of this invention and that it is my intention to cover all such changes as fall within the principle of the invention and the scope of the appended claims.

I claim:

1. A fitting for attachment to a cord, comprising a body portion, a retaining pin offset laterally with respect to said body portion and a tapered section connecting said pin to said body portion, said body portion and said tapered section being provided with a straight cord-receiving bore extending axially of said body portion.

2. A fitting comprising a body portion, a forwardly tapered section on one end of said body portion, a pin carried by the smaller end of said tapered section, the portion of said tapered section adjacent said body portion extending at a sharp angle with respect to the axis of said body portion and the smaller end of said tapered section extending at a smaller angle with respect to the axis of said body portion, said body portion and base of said tapered section being provided with a straight cord-receiving through-bore extending axially of said body portion.

OTTO J. BRATZ.